W. ELLMAKER.
SELF ACTING BRAKE FOR CARRIAGES.
No. 33,522.  Patented Oct. 22, 1861.
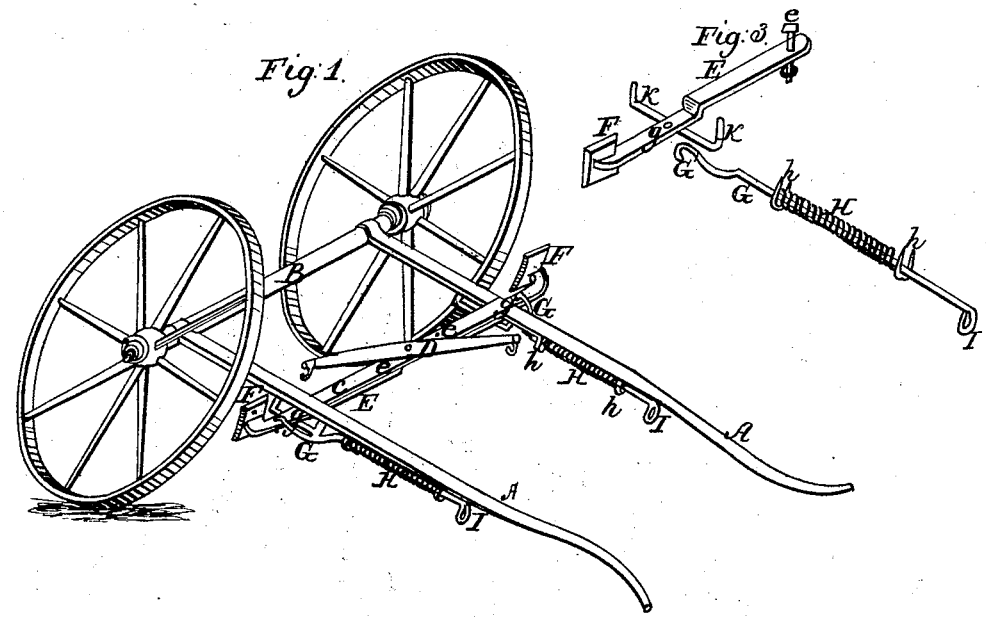
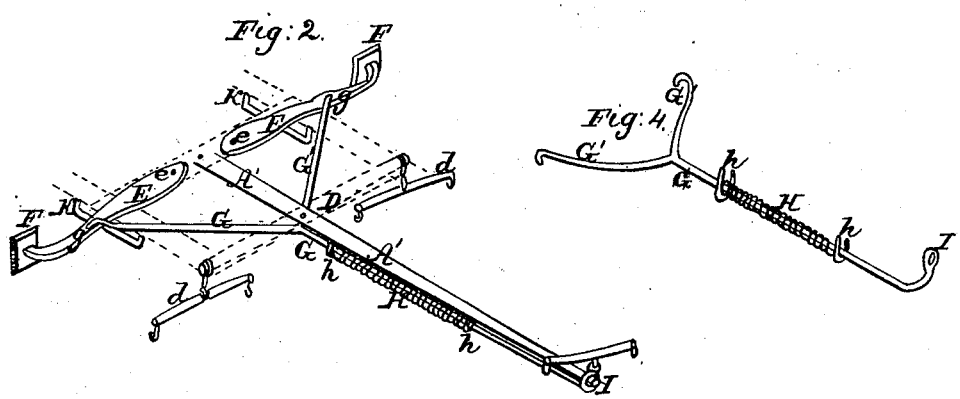
Witnesses:  Inventor;

UNITED STATES PATENT OFFICE.

WILLIAM ELLMAKER, OF NEW HOLLAND, PENNSYLVANIA.

IMPROVEMENT IN SELF-ACTING BRAKES FOR CARRIAGES.

Specification forming part of Letters Patent No. 33,522, dated October 22, 1861.

*To all whom it may concern:*

Be it known that I, WILLIAM ELLMAKER, of the town of New Holland, in the county of Lancaster and State of Pennsylvania, have invented a new and Improved Self-Acting and Reacting Brake for Vehicles; and I do hereby declare that the following is a full and exact description thereof, reference being had to the accompanying drawings and the letters of reference marked thereon, in which—

Figure 1 is a perspective view of the front wheels and shafts with the brake, &c., in place; Fig. 2, substantially the same applied to a pole. Figs. 3 and 4 show the several parts detached.

The object of my invention is mainly to apply a self-acting brake to buggies and vehicles of light carriage, so necessary in traveling over our hilly country roads, adapting it more particularly to the shafts of one-horse vehicles. The lever-arm E, Fig. 3, (either straight or curved,) has the rubber F on the outer end in front of the wheel. On the inner end there is a hole for the fulcrum-pin $e$, by which it is held against the under side of the cross-piece C, which unites the shafts A A, the lever being supported by and sliding in a staple K, longitudinally inserted under the shaft for that purpose. There is also a hole $g$ between the rubber and shaft, into which the end of the operating-rod G is hooked or connected thereto. The rod G is held under the shaft by two staples $h$. Between said staples is a coiled or spiral spring H, made of No. 13 wire, (will answer for ordinary one-horse vehicles.) The forward end of this rod is turned down, forming an eye I, through which the backing-strap is buckled in like manner as through the staple usually fixed into the under sider of the shaft. It will be seen that by using a single rod, Fig. 4, with a forked end $c\ c$ it is applicable to a pole also by simply carrying the other end forward and turned up with its eye I for connecting the yoke thereto, the levers, spring, &c., being identically the same, there being, of course, a lever and rubber in front of each of the front wheels, as shown, and a rod under each shaft.

The application of a bolt or pin for retaining or preventing the action of the levers when backing on the level ground is found needless. The springs are sufficient. The strength of the springs may be varied to the weight of the vehicle, &c.

This brake arrangement is out of sight, and so simple of application and cheap, in addition to its utility, as to be highly desirable for various reasons: first, it prevents the shafts from rising when going downhill, and in proportion to its steepness the gravitating pressure of the vehicle brings the wheels with more or less force against the rubbers, relieving the horse from sudden action by means of the coiled springs regulating the action, while at the same time they will react when the pressure is removed and disengage the rubbers from the wheels. Hence the driver can enjoy his ride without giving any attention to the brake, much to his own relief as well as to the relief of the horse.

I am aware that rods operating both simple or compound levers are not new in the use of self-acting brakes; nor do I broadly claim such separately considered.

What I claim as my invention, and desire to secure by Letters Patent, is—

The arrangement of the rod G, with its eye I, spiral spring H, hook end or ends G', in combination with the lever E, fulcrum and pin $e$, and rubber F, when arranged and combined substantially as herein set forth, for the purpose specified.

WM. ELLMAKER.

Witnesses:
E. G. GROFF,
C. P. HOFFMAN.